Aug. 12, 1952  R. D. GRAHAM  2,606,392
SPRAY GUN FOR DISTRIBUTING POWDERED MATERIAL
Filed Jan. 3, 1950  2 SHEETS—SHEET 1
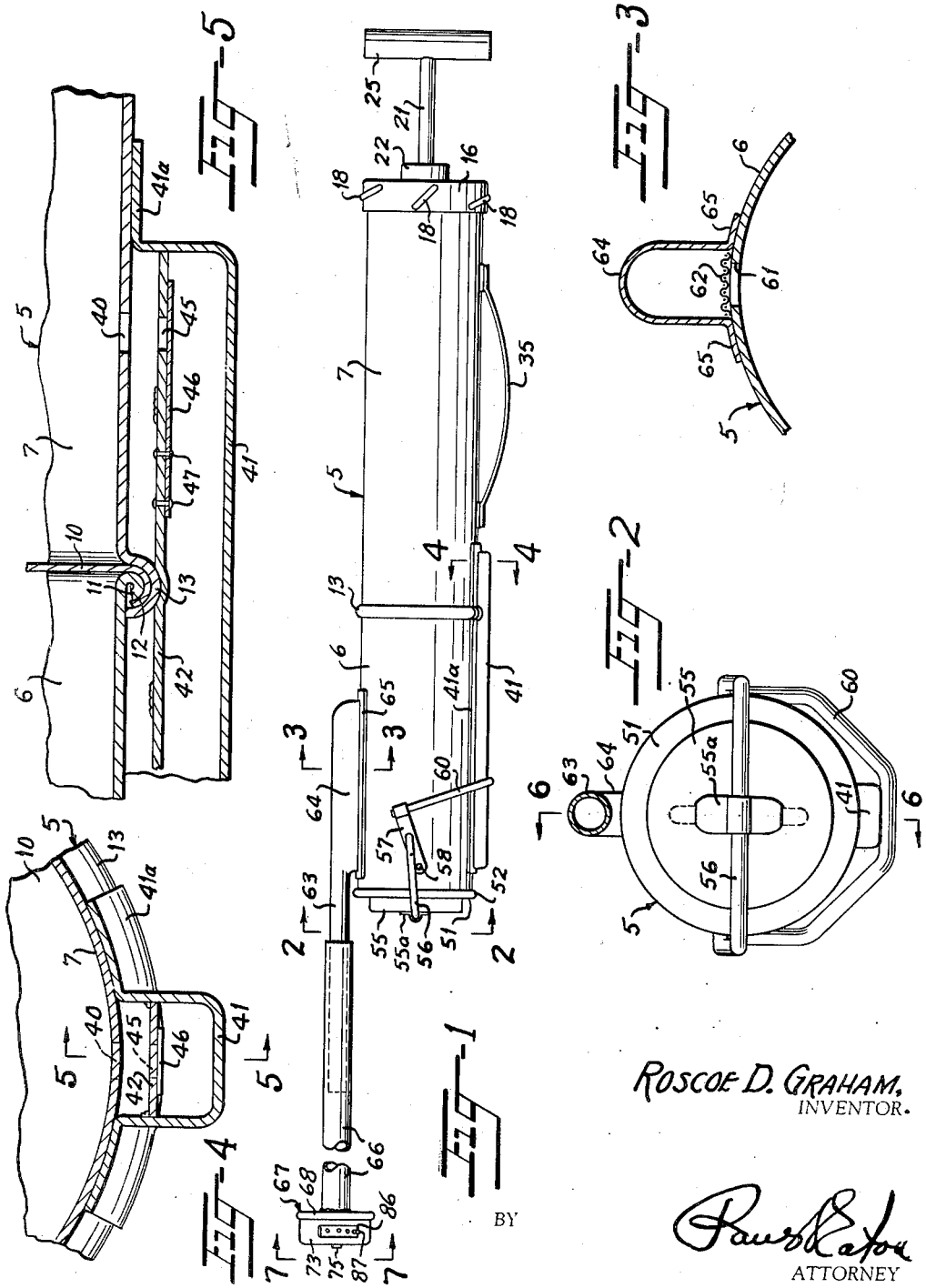
ROSCOE D. GRAHAM,
INVENTOR.
BY
ATTORNEY

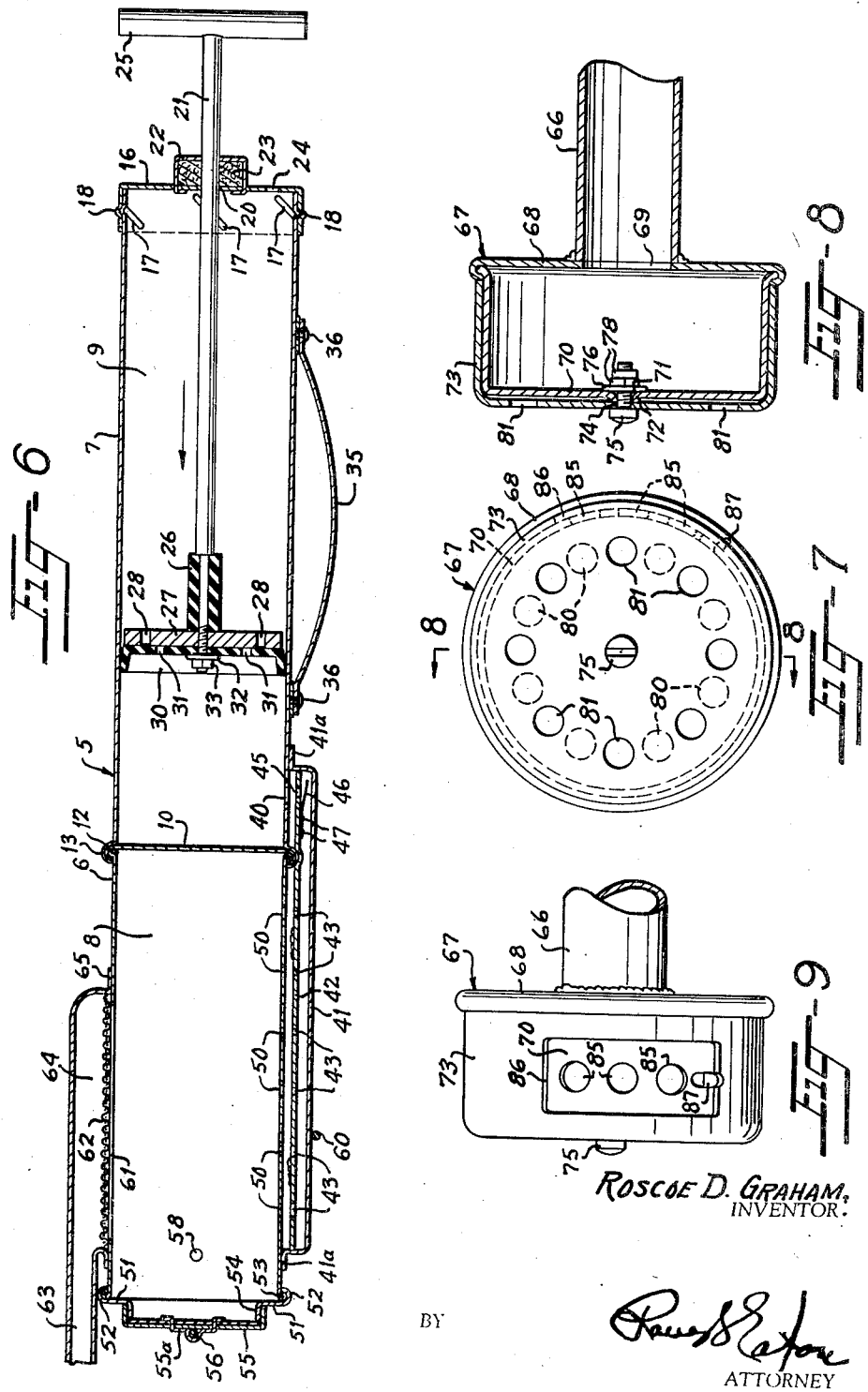

Patented Aug. 12, 1952

2,606,392

UNITED STATES PATENT OFFICE 2,606,392

SPRAY GUN FOR DISTRIBUTING POWDERED MATERIAL

Roscoe Douglas Graham, Greensboro, N. C.

Application January 3, 1950, Serial No. 136,510

3 Claims. (Cl. 43—147)

1

This invention relates to improvements in dust or powder distributing apparatus and more especially to a spray gun for distributing fertilizer, insecticides and the like in powdered or granulated form on garden plants or other types of vegetation.

It is an object of this invention to provide a manually operable spray gun having a storage chamber therein in which powdered insecticide or the like may be placed and also having a compressed air chamber and being provided with means for admitting compressed air from the air chamber into the storage chamber, the storage chamber being provided with a suitable nozzle or sprayer head so as to cause the powder to be emitted from the spray gun upon admittance of air to the storage chamber.

It is another object of this invention to provide a spray gun of the type described having a tubular extension connected to the powder storage chamber for directing the powder therein to points remote from the storage chamber when compressed air is admitted into the powder storage chamber.

It is still another object of this invention to provide a trough member connecting the compressed air chamber and the storage chamber so that air may flow from the air chamber through the trough into the powder chamber and having means in the trough to prevent the powder in the storage chamber from entering the air chamber and clogging the same.

It is still another object of this invention to provide a spray gun for spraying powdered material and having an extended conduit thereon to the free end of which a spray head is connected, the spray head having manually controlled means for discharging the powder from either the end or the side of the spray head, to thus distribute the powder to all immediate surfaces of a plant or other vegetation being sprayed.

Some of the objects of the invention having been stated, other objects will appear as the description proceeds, when taken in connection with the accompanying drawings, in which—

Figure 1 is a side elevation of the improved spray gun with parts broken away;

Figure 2 is an enlarged end elevation with parts in section taken substantially along the line 2—2 in Figure 2;

Figure 3 is an enlarged fragmentary vertical sectional view taken substantially along the line 3—3 in Figure 1;

Figure 4 is an enlarged fragmentary vertical sectional view through the trough taken substantially along the line 4—4 in Figure 1;

2

Figure 5 is an enlarged vertical sectional view taken substantially along the line 5—5 in Figure 4 and showing the valve spring member 46 in closed position;

Figure 6 is a longitudinal vertical sectional view through the main body of the spray gun taken substantially along the line 6—6 in Figure 2;

Figure 7 is an enlarged end elevation of the sprayer head and is taken looking substantially along the line 7—7 in Figure 1;

Figure 8 is a fragmentary vertical sectional view of the sprayer head and is taken substantially along the line 8—8 in Figure 7;

Figure 9 is an enlarged side elevation of the sprayer head shown in Figure 1 and showing it disassociated from the spray gun.

Referring more specifically to the drawings, there is shown a manually operable spray gun broadly designated at 5 and comprising a pair of axially alined hollow cylindrical members 6 and 7, preferably of sheet metal, and defining a powder or storage chamber 8 and a compressed air chamber 9, respectively, which are separated by a partition 10 in a manner to be presently described. Referring to Figure 5, it will be observed that the peripheral edge at the right-hand end of the cylindrical member 6 is rolled back upon itself, as at 11, and then the right-hand end of the member 6 is closed by the partition 10, the peripheral edge of which is rolled over the rolled edge 11 of the member 6 as at 12. The proximate peripheral edge of the cylindrical member 7 is then rolled, as at 13, over the rolled edges 11 and 12 of the member 6 and the partition 10 to thus form an air-tight seam locking these three members 6, 7 and 10 together.

The end of the cylindrical member 7, defining the compressed air chamber 9, remote from the partition 10 is closed by a removable cap member 16, the cylindrical member 7 having a plurality of spirally arranged male thread projections 17 formed therearound (Figure 6) and the flange of the cap member 16 having a plurality of coinciding spirally arranged female thread depressions formed therein, as at 18, so the cap member 16 may be tightened on the member 7 by turning the same in one direction. The cap member 16 has a bore 20 in the central portion thereof which is slidably penetrated by a plunger 21. A gland member 22 having a fibrous washer 23 therein is suitably secured to the outer surface of the cap member 16 and the plunger 21 also slidably penetrates the gland member 22 and the washer 23, the washer 23 in the gland member 22 acting as a wick-type reservoir for holding a lubricant for the plunger 21. The cap member 18 has a bore 24 therein to permit ingress and egress of air in the chamber 9. A suitable handle 25 is secured, as by a pressed fit, on the outer or right-hand end of the plunger 21.

The end of the plunger remote from the handle 25 is restricted and has a resilient sleeve 26 therearound and a disk 27 having a plurality of diametrically opposed bores 28 therein is slidably mounted on the restricted end of the plunger 21 adjacent the sleeve 26.

A resilient cup washer 30, preferably of rubber, provided with a plurality of diametrically opposed bores 31 therein is slidaly mounted on the restricted end of the plunger 21 and bears against the disk 27. The cup washer 30, the disk 27 and the sleeve 26 are secured on the plunger 21 by any suitable means such as a washer 32 and a nut 33, the nut 33 being threadably mounted on the threaded left-hand end of the plunger 21.

It will be observed that the diameter of the disk 27 is somewhat less than the interior diameter of the cylindrical member 7 and that the washer 30 is flanged in the usual manner. The portion of the cup washer 30 adjacent the disk 27 is of a smaller diameter than the interior diameter of the chamber 9, while the portion thereof remote from the disk 27 is normally of a slightly larger diameter than the diameter of the interior of the chamber 9, to thus cause the cup washer 30 to fit tightly against the interior surface of the cylindrical member 7.

The bores 31 in the washer 30 are disposed in such a manner as not to coincide with the bores 28 in the disk 27 to thus prevent the escapement of air therethrough or thereby from the portion of the chamber 9 disposed to the left of the disk 27, in Figure 6, when the disk 27 is being moved from right to left in Figures 1 and 6. When the plunger 21 is moved from left to right in Figure 6, the friction of the peripheral edges of the washer 30 engaging the interior surface of the cylindrical member 7 will cause the cup washer 30 to flex away from the plate 27 to permit air to pass through the bores 28 and the bores 31 into the left-hand portion of the chamber 9. The disk 27 and the associated parts may then be moved from right to left in Figure 6 to compress the air within the chamber 9.

A suitable handle 35 is secured to the outer surface of the cylindrical member 7, as by rivets 36, for carrying the spray gun either while it it is in use or in transporting the spray gun from one place to another.

The lower left-hand portion of the cylindrical member 9, in Figure 6, is provided with a bore 40 and a trough member 41, which is substantially U-shaped in cross-section and has a peripheral flange 41a, has its flange 41a secured, as by spot welding, to the lower portions of the cylindrical members 6 and 7. The trough 41 is arranged, in Figures 1 and 6, so as to be disposed under one end of the cylindrical member 7 and under a substantial portion of the member 6. The bore 40 communicates with the interior of the trough member 41.

The trough member 41 has a longitudinally extending partition 42 secured thereto, as by welding, and having a plurality of bores 43 therein at that part of the partition disposed beneath the chamber 8. The partition 42 also has a bore 45 therein directly beneath the bore 40 in the cylindrical member 7, to thus permit air to pass from the chamber 9 through the bores 40 and 45 into the trough 41 and then upwardly through the bores 43 and into the chamber 8 in a manner to be presently described. It is to be noted that the bores 43 in the partition 42 are of greater diameter at the left-hand end, in Figure 6, than they are at the right-hand end of the partition 42, in Figure 6, the diameter gradually decreasing from left to right. The purpose of this is so that the pressure of the air passing through the trough 41 and upwardly through the bores 43 will be substantially the same through each of the bores 43.

A valve means comprising a spring member 46 is secured to the lower surface of the trough partition 42, by any suitable means such as rivets 47, and this leaf spring member normally remains in a closed position as shown in Figure 5. However, when air is forced through the bores 40 and 45, the pressure of the air will cause the spring member 46 to move opened position as shown in Figure 6.

The cylindrical member 6 is provided with a plurality of spaced bores 50 coinciding with the bores 43 in the partition 42 to permit air to flow into the chamber 8 from the trough 41 in the manner heretofore described. It is evident that the partition 42 may be omitted, if desired, and is merely provided to assist in restricting the flow of powder from within the storage chamber 8 into the trough 41. The left-hand end of the cylindrical member 6 (Figure 6) is partially closed by an annular member 51, the peripheral edge of which is rolled, as at 52, over a rolled edge 53 of the cylindrical member 6 to thus secure the annular member 51 on the cylindrical member 6. The annular member 51 has a flange 54 on its inner peripheral edge projecting outwardly therefrom over which the flanged peripheral edge of a cup-shaped closure member 55 is adapted to be slidably mounted.

The closure member 55 is adapted to be slidably mounted on the flange 54 projecting from the inner peripheral edge of the annular member 51 and which may be removed for replenishing the supply of insecticide or other powdered material which may be placed in the chamber 8.

In order to hold the closure member 55 in a closed position, the closure member 55 has a bearing member 55a suitably secured thereto which is adapted to slidably receive the medial portion of a substantially U-shaped member 56, the legs of which extend toward the handle member 25 and terminate a substantial distance to the right of the seam formed by the rolled edge 52 of the annular member 51. The free ends of the legs of the U-shaped member 56 are pivotally connected intermediate the ends of suitable links 57 disposed at opposed sides of the cylindrical member 6, only one of which is shown in the drawings.

The links 57 are pivotally connected, as at 58, to opposed sides of the cylindrical member 6 and at a point more closely adjacent the closure member 55 than the point at which the U-shaped member 56 is connected to the links 57. The upper ends of the legs of a substantially U-shaped locking member 60 are secured in the free ends of the links 57, as by a pressed fit, and this U-shaped member 60 extends downwardly and normally passes beneath the trough member 41 when the closure member 55 is in a closed position. It is evident that the links 57 will hold the closure member 55 in a tightly closed position when the substantially U-shaped member 60 is moved in a counterclockwise manner to the position shown in Figure 1 and to where the pivot 58 of the links 57 will be disposed beneath the longitudinal plane of the U-shaped member 56.

The lower portion of the member 60, in Figure 1, may be moved from right to left to cause the links 57 to pivot in a clockwise direction to move the ends of the U-shaped member 56 to a point below dead-center to permit the closure member 55 to be removed from the end of the cylindrical member 6.

The upper portion of the cylindrical member 6 is provided with a longitudinally extending slot 61 disposed directly above the bores 50 in the lower portion of the cylindrical member 6 and a suitable foraminated screen 62, which covers the slot 61, is secured to the upper surface of the cylindrical member 6 by any suitable means such as soldering. A pipe or conduit 63 having one end thereof flared to form a substantially U-shaped cross-sectional portion 64 and having a peripheral flange 65, is secured by any suitable means, such as spot welding, to the upper outer surface of the cylindrical member 6 so as to cover the slot 61. The pipe 63 extends to the left, in Figure 1, and has one end of a sprayer head pipe or conduit 66, of a slightly larger diameter than the pipe 63, telescopically mounted thereon. The free end of the pipe 66 has a sprayer head broadly designated at 67 secured thereto by any suitable means such as welding.

The sprayer head 67 is shown in detail in Figures 6, 7 and 8 and comprises a disk member 68 having a bore 69 therein which coincides with the interior of the pipe 66 and which is rolled over at its peripheral edge to confine the flared peripheral edge of a cup-like member 70 therein thus securing the member 70 to the disk 68. The cup-like member 70 has a centrally located punched hole 71 therein, the material defining the wall of the hole 71 being flared outwardly as at 72.

A second or rotatably adjustable cup-like member 73 rotatably engages the flared wall 72 of the hole 71. The member 73 is fitted for rotation around the outer surface of the member 70 and has a bore 74 in the central portion thereof coinciding with the hole 71 in the center of the member 70. A bolt 75 slidably penetrates the bore 74 in the cup-like member 73, as well as the hole 71 in the member 70, and is confined thereon by a washer 76 and a nut 78. The bolt 75 holds the cup-like member 73 in frictional engagement with the fixed cup-like member 70.

The fixed cup-like member 70 has a plurality of circularly spaced bores 80 therein, which may be observed in dotted lines in Figure 7, and the member 73 also has a plurality of circularly spaced bores 81 therein. Now, it will be observed, in Figure 7, that the rotatably adjustable member 73 may be partially rotated so that the bores 81 in the member 73 will coincide with the bores 80 in the member 70. When these bores 80 and 81 coincide, the powder being forced from the chamber 8 through the pipes 63 and 66 into the sprayer head 67, will be emitted from the sprayer head 67 through the bores 80 and 81.

Referring to Figure 9, it will be observed that one side of the side wall of the fixed cup-like member 70 has a plurality of bores 85 therein and one side of the side wall of the rotatably adjustable cup-like member 73 has a slot 86 therein of a length sufficient to permit all of the bores 85 to be exposed when the cup-like member is positioned so the slot 86 coincides with these bores 85.

The member 70 has a suitable stop such as a tab 87 punched in one side thereof, adjacent the lowermost hole 85 in Figure 9, and which is adapted to engage one of the walls of the slot 86 to restrict rotation of the rotatably adjustable cup-like member 73 past a given point. It will thus be observed that when the slot 86 is in the position shown in Figure 9, powder being forced from the chamber 8 will be discharged through the bores 85 in the fixed cup-like member 70. As will be observed in Figure 8, when the slot 86 is in this position the bores 80 are closed by the cup-like member 73 and no powder will be discharged through the end of the sprayer head 67.

The bores 85 are provided so as to permit the sprayer head 67 to be placed beneath a plant with the bores 85 facing upwardly to thus permit powdered insecticide or the like to be sprayed on the under side of the foliage of a plant. Now, when it is desired to spray powder from the end of the sprayer head 67, the member 73 may be turned in a counterclockwise direction, in Figure 7, to where the stop or tab 87 will engage the upper wall of the slot 86, in Figures 7 and 9, to thus close the bores 85 and, at this point, the bores 81 will coincide with the bores 80 to permit the powdered insecticide to be sprayed through the bores 80 and 81 in the end of the sprayer head 67.

It is thus seen that I have provided an improved spray gun which may be used to spray insecticide or the like in powdered form on various types of vegetation and in which the powdered insecticide may be placed in the chamber 8 and the trough 41 will prevent the insecticide powder from entering the air chamber 9. Therefore, the plunger 21 and its associated parts will always work freely and will not become coated with the powder, which would likely result in the movable parts binding against the stationary parts. It is also seen that I have provided an improved sprayer head from which powder may be sprayed, either from the end of the sprayer head 67 or, if it is desired to spray under the foliage of plants or the like, the member 73 may be rotatably mounted on the fixed cup-like member 70 so that the powder may be emitted from the side of the sprayer head rather than the end thereof. Obviously, this side may be turned upwardly so that an operator can spray the under surface of the plants. Further, the telescopic construction of the conduits 63 and 66 permits the sprayer head 67 to be placed in normally inaccessible areas to permit the operator to spray all parts of the plants or other vegetation to be sprayed.

I claim:

1. A spray gun for spraying powdered material on vegetation comprising a cylindrical member having a transverse partition therein dividing the same into an air chamber and a powder chamber, a trough member secured to the exterior of the cylindrical member and extending longitudinally thereof, a portion of the trough being disposed on the wall of the powder chamber and extending substantially the length of the powder chamber, said cylindrical member having bores therein connecting the powder chamber with the trough member, said cylindrical member also having a bore therein connecting the air chamber with the trough member, said cylindrical member having a conduit secured to one side thereof and communicating with the chamber, said cylindrical member having a removable closure member no the end thereof remote from the air chamber, said trough member having a longitudinally extending partition therein provided with spaced holes coinciding with the bores in the cylindrical member which connect the trough to the powder chamber and the air chamber.

2. A spray gun comprising a pair of axially alined hollow cylindrical members secured to each other at their proximate ends and defining a powder chamber and an air chamber, a partition separating said chambers at their junction point, a trough member secured to the cylindrical members and extending longitudinally thereof, the cylindrical member defining said air chamber having a bore therein communicating with said trough member, the cylindrical member defining said powder chamber having a plurality of spaced bores therein communicating with said trough member, said trough member having a longitudinally extending partition therein provided with a plurality of spaced bores in alinement with the bores in said powder chamber also having a single bore adjacent the single bore in the wall of the air chamber, a leaf spring secured to the side of said trough partition which is remote from the air chamber and normally closing the bore therein, said cylindrical member defining said powder chamber having a longitudinally extending slot therein diametrically opposed to said trough, a screen covering said slot and secured to said cylindrical member forming a powder chamber, a conduit having one side thereof cut away and secured to the cylindrical member forming the powder chamber and covering said slot.

3. A spray gun for powdered material comprising two cylindrical members seamed together at their proximate ends and having a partition member with its peripheral edges also seamed into the proximate ends of the two cylindrical members, the two cylindrical members forming respectively an air chamber and a powder chamber, a trough member having its open side secured to the exterior of a major portion of the powder chamber and also secured to the exterior portion of the air chamber adjacent said partition, said trough member having a longitudinally extending partition dividing the trough member into inner and outer passageways, the wall of said cylindrical member forming the powder chamber covered by the trough member having a plurality of spaced bores therein, said longitudinally extending partition having a plurality of bores therein coinciding with the bores in the cylindrical member forming the powder chamber, the longitudinally extending partition also fitting tightly against the seam joining the two cylindrical members and having a bore therein in the end adjacent the cylindrical member forming the air chamber, the cylindrical member forming the air chamber having a bore coinciding with the space defined by the trough, a spring valve member normally closing the last-named bore in the longitudinally extending partition and being adapted to be moved to open position when compressed air is present in the air chamber, the spaced bores in the longitudinally extending partition progressively increasing in size as they extend from the juncture point of the two cylindrical members toward the outer end of the trough member, the cylindrical member forming the powder chamber having an elongated longitudinally extending slot extending a major portion of the length of the cylindrical member forming the powder chamber, a screen covering said slot and a conduit having an open side secured to the outer surface of the cylindrical member forming the powder chamber and through which powder is adapted to be expelled upon compressed air being generated in the powder chamber.

ROSCOE DOUGLAS GRAHAM.

REFERENCES CITED

The following references are of record in the file of this patent:

UNITED STATES PATENTS

| Number | Name | Date |
|---|---|---|
| 852,065 | Keller | Apr. 30, 1907 |
| 1,400,162 | Holmes | Dec. 13, 1921 |
| 1,422,253 | Brown | July 11, 1922 |
| 1,464,457 | Wendel | Aug. 7, 1923 |
| 1,676,462 | Root | July 10, 1928 |
| 1,785,944 | Ezdorf | Dec. 23, 1930 |
| 1,869,483 | Knapp et al. | Aug. 2, 1932 |
| 1,968,541 | Tatum | July 31, 1934 |
| 2,086,696 | Brandt | July 13, 1937 |
| 2,148,726 | Brandt | Feb. 28, 1939 |
| 2,163,477 | Warr et al. | June 20, 1939 |
| 2,226,013 | Oys | Dec. 24, 1940 |